(12) United States Patent
Gill et al.

(10) Patent No.: US 9,137,167 B2
(45) Date of Patent: Sep. 15, 2015

(54) HOST ETHERNET ADAPTER FRAME FORWARDING

(71) Applicant: International Business Machines Corporation, Armonk, NY (US)

(72) Inventors: Aaron K. Gill, Austin, TX (US); Farnaz Toussi, Minneapolis, MN (US)

(73) Assignee: International Business Machines Corporation, Armonk, NY (US)

(*) Notice: Subject to any disclaimer, the term of this patent is extended or adjusted under 35 U.S.C. 154(b) by 89 days.

(21) Appl. No.: 13/772,417

(22) Filed: Feb. 21, 2013

(65) Prior Publication Data

US 2014/0164553 A1 Jun. 12, 2014

Related U.S. Application Data

(63) Continuation of application No. 13/712,529, filed on Dec. 12, 2012.

(51) Int. Cl.
| | | |
|---|---|---|
| H04L 12/861 | (2013.01) | |
| H04L 12/879 | (2013.01) | |
| H04L 12/883 | (2013.01) | |
| H04L 12/863 | (2013.01) | |
| H04L 29/08 | (2006.01) | |

(52) U.S. Cl.
CPC .......... *H04L 47/50* (2013.01); *H04L 29/08801* (2013.01); *H04L 49/9052* (2013.01)

(58) Field of Classification Search
USPC .................. 370/225, 252, 389; 709/225, 250
See application file for complete search history.

(56) References Cited

U.S. PATENT DOCUMENTS

| | | | |
|---|---|---|---|
| 6,453,388 B1* | 9/2002 | Gonzales et al. | 711/137 |
| 6,564,267 B1 | 5/2003 | Lindsay | |
| 6,704,831 B1* | 3/2004 | Avery | 710/310 |
| 6,832,310 B1 | 12/2004 | Bailey et al. | |
| 7,012,926 B2 | 3/2006 | Weng et al. | |
| 7,058,789 B2 | 6/2006 | Henderson et al. | |

(Continued)

FOREIGN PATENT DOCUMENTS

| | | |
|---|---|---|
| EP | 1517511 A1 | 3/2005 |
| JP | 2009159272 A | 7/2009 |
| WO | 2008080215 A1 | 7/2008 |

OTHER PUBLICATIONS

Agarini, L. et al., "Integrated Virtual Ethernet Adapter: Technical Overview and Introduction", IBM Redbooks, Oct. 2007, First Edition, © Copyright IBM Corporation 2007.

(Continued)

*Primary Examiner* — Edan Orgad
*Assistant Examiner* — Steven Willmore
(74) *Attorney, Agent, or Firm* — Jay A. Wahlquist; Robert R. Williams

(57) ABSTRACT

A method for receiving a data packet is described. The method may include receiving a frame in a host Ethernet adapter from an Ethernet network. The frame may be parsed to determine a data packet size. A work queue element (WQE) may be selected from two or more available WQEs having different data packet size capacity. Data packet storage may be provided for each WQE, including at least some cache storage associated with a processor. The data packet may be stored in the data packet storage associated with the selected WQE based on the data packet size, including storing in the cache for data packets under selected conditions.

9 Claims, 6 Drawing Sheets

(56) References Cited

U.S. PATENT DOCUMENTS

| | | | |
|---|---|---|---|
| 7,307,998 B1* | 12/2007 | Wang et al. | 370/412 |
| 7,508,771 B2 | 3/2009 | Basso et al. | |
| 7,606,141 B2 | 10/2009 | Schimke et al. | |
| 7,606,166 B2 | 10/2009 | Basso et al. | |
| 7,644,221 B1 | 1/2010 | Chan et al. | |
| 7,689,738 B1 | 3/2010 | Williams et al. | |
| 8,090,081 B2* | 1/2012 | Kent et al. | 379/88.12 |
| 8,090,810 B1* | 1/2012 | Insley et al. | 709/223 |
| 2002/0152315 A1* | 10/2002 | Kagan et al. | 709/228 |
| 2003/0061417 A1* | 3/2003 | Craddock et al. | 710/54 |
| 2003/0091055 A1* | 5/2003 | Craddock et al. | 370/412 |
| 2003/0131205 A1* | 7/2003 | Huck | 711/155 |
| 2003/0200315 A1* | 10/2003 | Goldenberg et al. | 709/225 |
| 2004/0015622 A1* | 1/2004 | Avery | 710/22 |
| 2004/0109465 A1 | 6/2004 | Kim et al. | |
| 2005/0207436 A1* | 9/2005 | Varma | 370/412 |
| 2005/0256975 A1 | 11/2005 | Kaniz et al. | |
| 2006/0029088 A1* | 2/2006 | Dorsch et al. | 370/412 |
| 2006/0069879 A1* | 3/2006 | Inoue et al. | 711/147 |
| 2006/0129699 A1* | 6/2006 | Kagan et al. | 709/250 |
| 2006/0221952 A1* | 10/2006 | Basso et al. | 370/389 |
| 2006/0221966 A1* | 10/2006 | Basso et al. | 370/392 |
| 2007/0079073 A1* | 4/2007 | Rosenbluth et al. | 711/134 |
| 2008/0091915 A1* | 4/2008 | Moertl et al. | 711/206 |
| 2008/0165777 A1 | 7/2008 | Gainey et al. | |
| 2008/0244084 A1 | 10/2008 | Dierks et al. | |
| 2008/0273539 A1* | 11/2008 | Basso et al. | 370/395.32 |
| 2009/0077268 A1* | 3/2009 | Craddock et al. | 709/250 |
| 2009/0135840 A1 | 5/2009 | Murray et al. | |
| 2011/0116512 A1* | 5/2011 | Crupnicoff et al. | 370/463 |
| 2011/0161608 A1* | 6/2011 | Bellows et al. | 711/162 |
| 2011/0173353 A1 | 7/2011 | Bauman et al. | |
| 2011/0289180 A1* | 11/2011 | Sonnier et al. | 709/213 |
| 2012/0159132 A1 | 6/2012 | Abel et al. | |
| 2012/0191896 A1* | 7/2012 | Fang et al. | 711/6 |
| 2012/0192190 A1* | 7/2012 | Basso et al. | 718/102 |
| 2013/0091330 A1* | 4/2013 | Mital et al. | 711/130 |
| 2013/0097608 A1* | 4/2013 | Kessler et al. | 718/104 |
| 2014/0143454 A1* | 5/2014 | Hayut et al. | 710/19 |

OTHER PUBLICATIONS

Hacker et al., "Experiences Using Web100 for End-To-End Network Performance Tuning", pp. 1-9.

Rindos et al., "High Performance Tuning Tips for Communications Adapters: Token Ring, Ethernet and ATM", IBM Corporation, Research Triangle Park, NC.

Basso et al., "Host Ethernet Adapter for Handling Both Endpoint and Network Node Communications", U.S. Appl. No. 13/011,663, filed Jan. 21, 2011.

* cited by examiner

HOST ETHERNET ADAPTER FRAME FORWARDING

CROSS-REFERENCE TO RELATED APPLICATIONS

This application is a continuation of co-pending U.S. patent application Ser. No. 13/712,529, filed Dec. 12, 2012. The aforementioned related patent application is herein incorporated by reference in its entirety.

FIELD

The present invention relates to a host Ethernet adapter, and more particularly storing host Ethernet adapter data packets in cache.

BACKGROUND

Many computer networks include a plurality of individual computers or servers that communicate over a network, such as an Ethernet network. Data packets may be sent from computer to computer over the Ethernet network in accordance with one of various communication protocols, such as Transmission Control Protocol (TCP) and Internet Protocol (IP). The speed of network communications has increased over time, such that 10 gigabit per second speed for Ethernet network TCP/IP communications is now common. This high speed, combined with ever increasing volumes of data traffic, consume tremendous processing and memory bandwidth in a computer. Each computer in the network may include a host Ethernet adapter (HEA) designed to facilitate communications that terminate at an operating system running on the computer.

SUMMARY

In one aspect, a method for receiving a data packet is described. The method may include receiving a frame in a host Ethernet adapter from an Ethernet network. The frame may be parsed to determine a data packet size. A work queue element (WQE) may be selected from two or more available WQEs having different data packet size capacity. Data packet storage may be provided for each WQE, including at least some cache storage associated with a processor. The data packet may be stored in the data packet storage associated with the selected WQE based on the data packet size, including storing in the cache for data packets under selected conditions.

In another aspect, a method for sending a data packet is described. The method includes producing a data packet. The data packet size may be determined. A work queue element (WQE) from two or more available WQEs having different data packet size capacity may be selected. Data packet storage may be provided for each WQE, including at least some cache storage associated with a processor. The data packet may be stored in the data packet storage associated with the selected WQE based on the data packet size, including storing in the cache for data packets under selected conditions. The data packet may be retrieved from the selected WQE and a frame may be built. The frame may be sent, via a host Ethernet adapter, to an Ethernet network.

In yet another aspect, a computer system is described. The computer system includes a host Ethernet adapter adapted to receive a frame from an Ethernet network, parse the frame to determine a data packet size, and select a work queue element (WQE) from two or more available WQEs having different data packet size capacity. A data packet storage for each WQE, including at least some cache storage associated with a processor. The HEA is operable to store the data packet in the data packet storage associated with the selected WQE based on the data packet size. The HEA is further operable to store the data packet in the cache under selected conditions.

BRIEF DESCRIPTION OF THE DRAWINGS

In the drawings and the Detailed Description, like numbers generally refer to like components, parts, steps, and processes.

DETAILED DESCRIPTION

Host Ethernet adapters (HEA) may be used to facilitate receiving data packets from an Ethernet network and storing the packets on a computer system. Furthermore, HEAs may be used to send data packets from the computer system out on the Ethernet network. Applications on the computer system interface with the HEA hardware through queue pairs. A queue pair typically has a send queue and a receive queue. Each queue may have a dedicated region of system memory allocated to it. Each queue includes one or more work queue elements (WQE). While physical system memory may be allocated for them, queues and WQEs are logical concepts used for keeping track of packets and other purposes. Accordingly, an adaptor may be provided with a memory for particular queues or WQEs for which system memory is also allocated. The data packets to be sent or received by the HEA may be stored in a respective WQE, i.e., in both system and adaptor memory.

WQEs may typically be the size of the largest packet size. Packets that are smaller than the WQE size may be "stored" in each WQE, however, the portion of the pre-allocated memory region that is not used in each WQE may be wasted because the next packet may be stored in the following memory address region according to the next available WQE. When stored in main memory, the memory mismatch between the small packets and the WQEs may not affect speed of the system or cause system issues. If the WQEs are stored in other types of memory, then problems may arise is discussed further below.

To increase speed and performance some packets may be stored in an L2 cache shared by several processors. L2 cache may be limited in storage size and may be used for multiple operations. If too many large WQEs are assigned to the L2 cache, performance may not improve due to L2 cache thrashing, which is the repeated displacing and loading of cache lines. In particular, small packets assigned to each WQE may inefficiently use L2 cache. For example, a 64 byte packet may be stored in the L2 cache and the packet may be assigned to a WQE of 1500 bytes with address 0 and the next 64 byte packet may be stored in the L2 cache with address 1501. As a result, the address range 64-1436 will not be referenced for storing 64 byte packets, which reduces effective L2 cache size and may cause L2 thrashing.

In one aspect, a system and method is described for storing data packets in L2 cache that minimizes cache thrashing. The aspect may include having multiple queue pairs where one queue pair has small sized WQEs and another queue pair has large sized WQEs. Variable sized WQEs may allow the number of cache lines allocated for packets to better match packet size, resulting in more effective use of cache by minimizing cache thrashing when storing data packets received from or sent by the Ethernet network.

Figure 1:
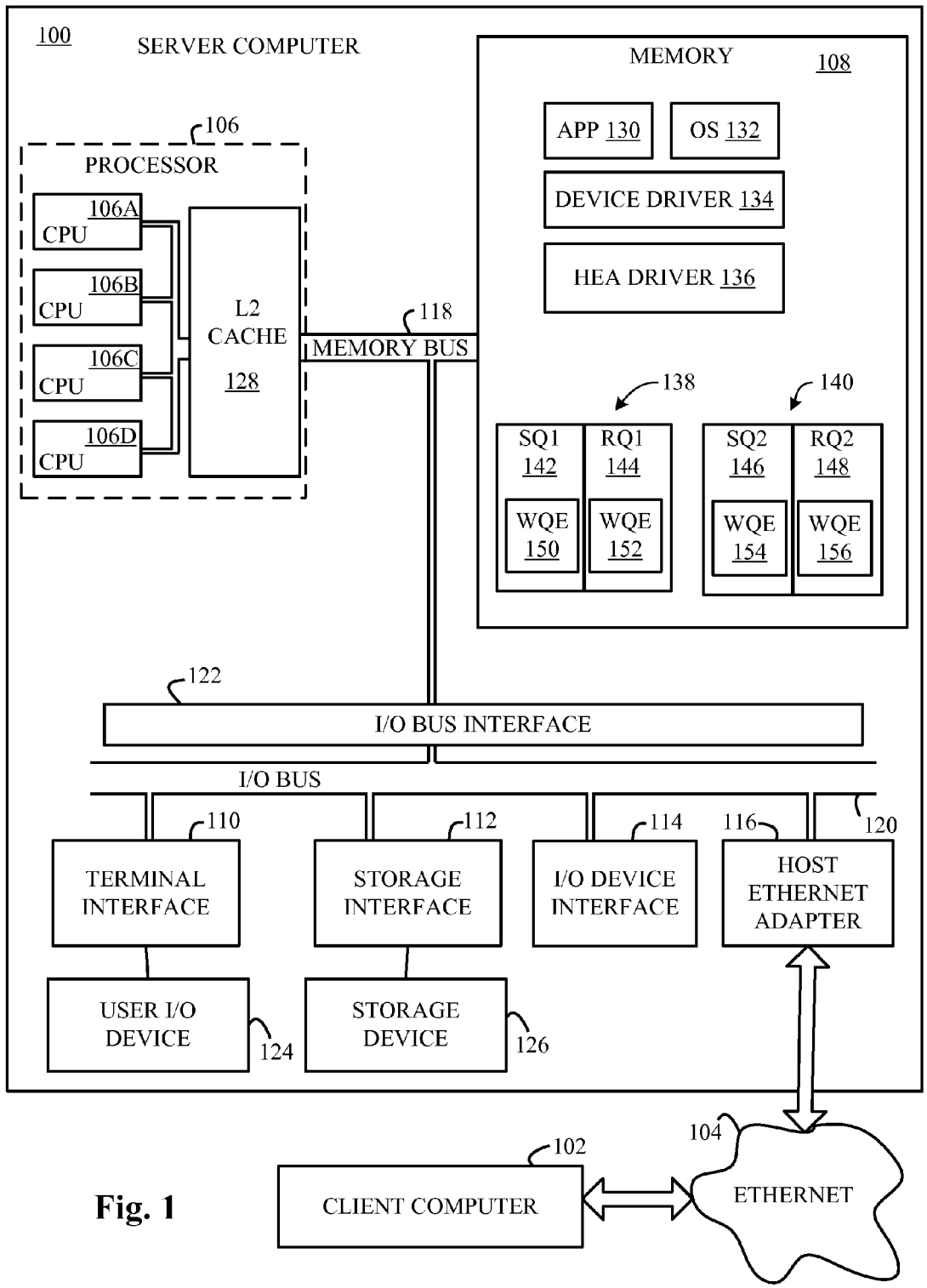
FIG. 1 is a block diagram of a host Ethernet adapter (HEA) installed in a computer system having multiple processors according to an aspect.

Referring to the drawings, wherein like numbers denote like parts throughout the several views, FIG. 1 depicts a high-level block diagram representation of a server computer system 100 connected to a client computer system 102 via an Ethernet network 104, according to an aspect. The terms "server" and "client" are used herein for convenience only, and in various aspects a computer system that operates as a client computer in one environment may operate as a server computer in another environment, and vice versa. The mechanisms and apparatus of aspects of the present invention apply equally to any appropriate computing system, including a computer system that does not employ the client-server model.

The major components of the computer system 100 may include one or more processors 106, a main memory 108, a terminal interface 110, a storage interface 112, an I/O (Input/Output) device interface 114, and a host Ethernet adapter (HEA) 116, all of which may be communicatively coupled, directly or indirectly, for inter-component communication via a memory bus 118, an I/O bus 120, and an I/O bus interface unit 122.

The computer system 100 may contain one or more general-purpose programmable central processing units (CPUs) 106A, 106B, 106C, and 106D, herein generically referred to as the processor 106. In an aspect, the computer system 100 may contain multiple processors; however, in another aspect the computer system 100 may alternatively be a single CPU system. Each processor 106 may execute instructions stored in the main memory 108 and may include one or more levels of on-board cache, such as L2 cache 128. The L2 cache 128 may contain logic, e.g., a cache controller, for receiving and sending data and packets from the I/O bus 120 and memory bus 118. The processor 106 may include multiple levels of cache in various embodiments, such as L1, L2, and L3 caches.

In an aspect, the main memory 108 may include a random-access semiconductor memory, storage device, or storage medium (either volatile or non-volatile) for storing or encoding data and programs. In another aspect, the main memory 108 may represent the entire virtual memory of the computer system 100, and may also include the virtual memory of other computer systems coupled to the computer system 100 or connected via the Ethernet network 104. The main memory 108 may be conceptually a single monolithic entity, but in other aspects the main memory 108 may be a more complex arrangement, such as a hierarchy of caches and other memory devices.

The main memory 108 may store or encode an application 130, an operating system 132, a device driver 134, and an HEA driver 136. An application 130 is a computer program having instructions capable of carrying out user-level data processing tasks. Examples of such applications include word processing applications, spreadsheet applications, web server applications, database management applications, media library applications, media playback applications, media transcoding applications, and so on as will occur to readers of skill in the art.

Furthermore, main memory 108 may include a first queue pair 138 and a second queue pair 140. A queue pair may be a set of two queues that provide a send/receive facility for the HEA 116. The first queue pair 138 may have a first send queue 142 and a first receive queue 144. The second queue pair 140 may have a second send queue 146 and a second receive queue 148. Each queue pair 138 and 140 may be allocated a dedicated region of the main memory 108. Also, the region of the main memory 108 dedicated for each queue may be divided up into ranges or memory blocks. Each of these memory blocks may be identified with unique, dedicated memory addresses. Each block or address range is associated with a WQE. The memory blocks may store data packets received from or sent by the HEA 116. The WQEs may be used to direct data packets to a memory address in the queue pairs 138 and 140.

Figure 3:
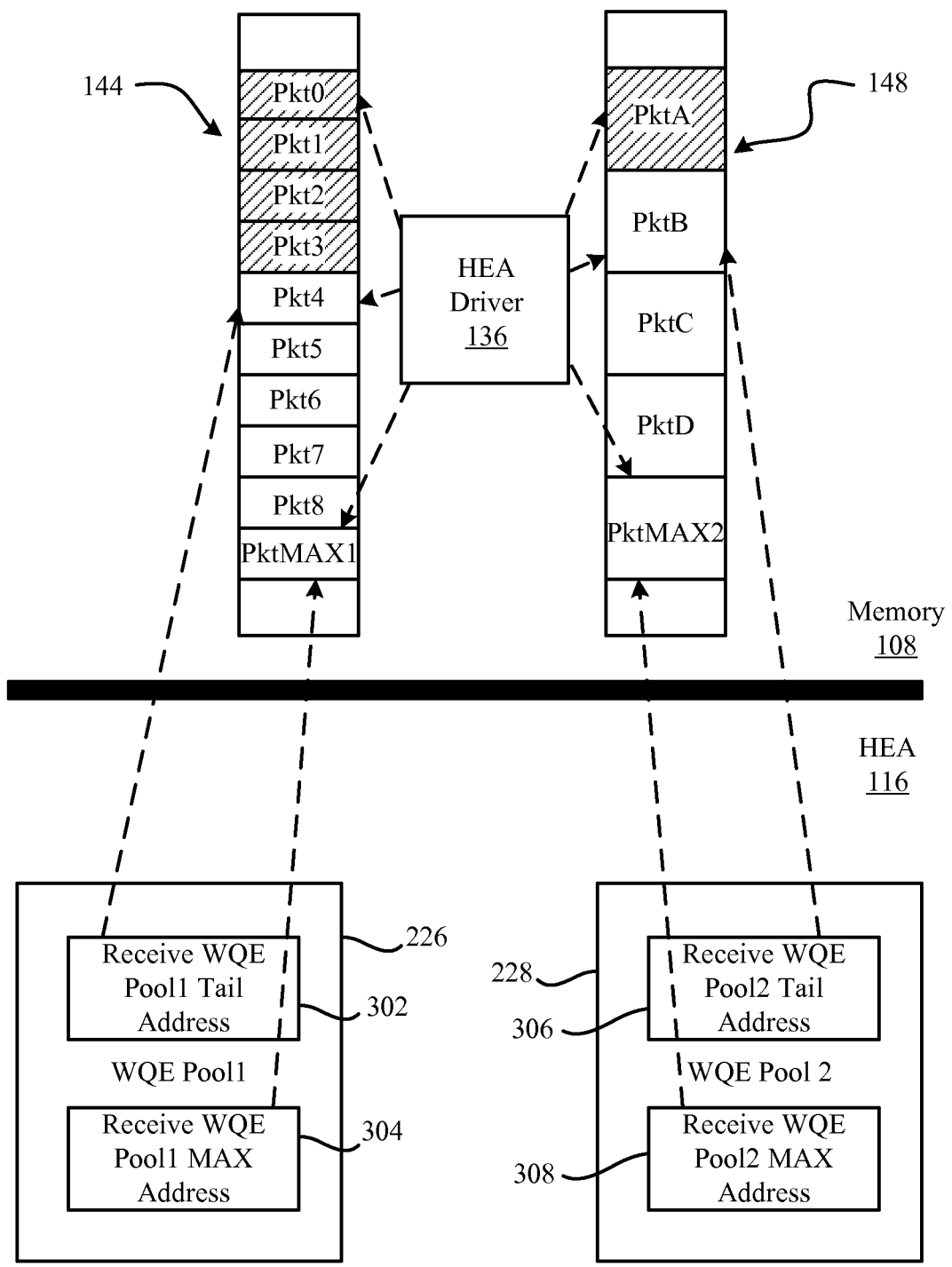
FIG. 3 illustrates receive work queue element (WQE) pools of different WQE sizes and their memory address space according to an aspect.
Figure 4:
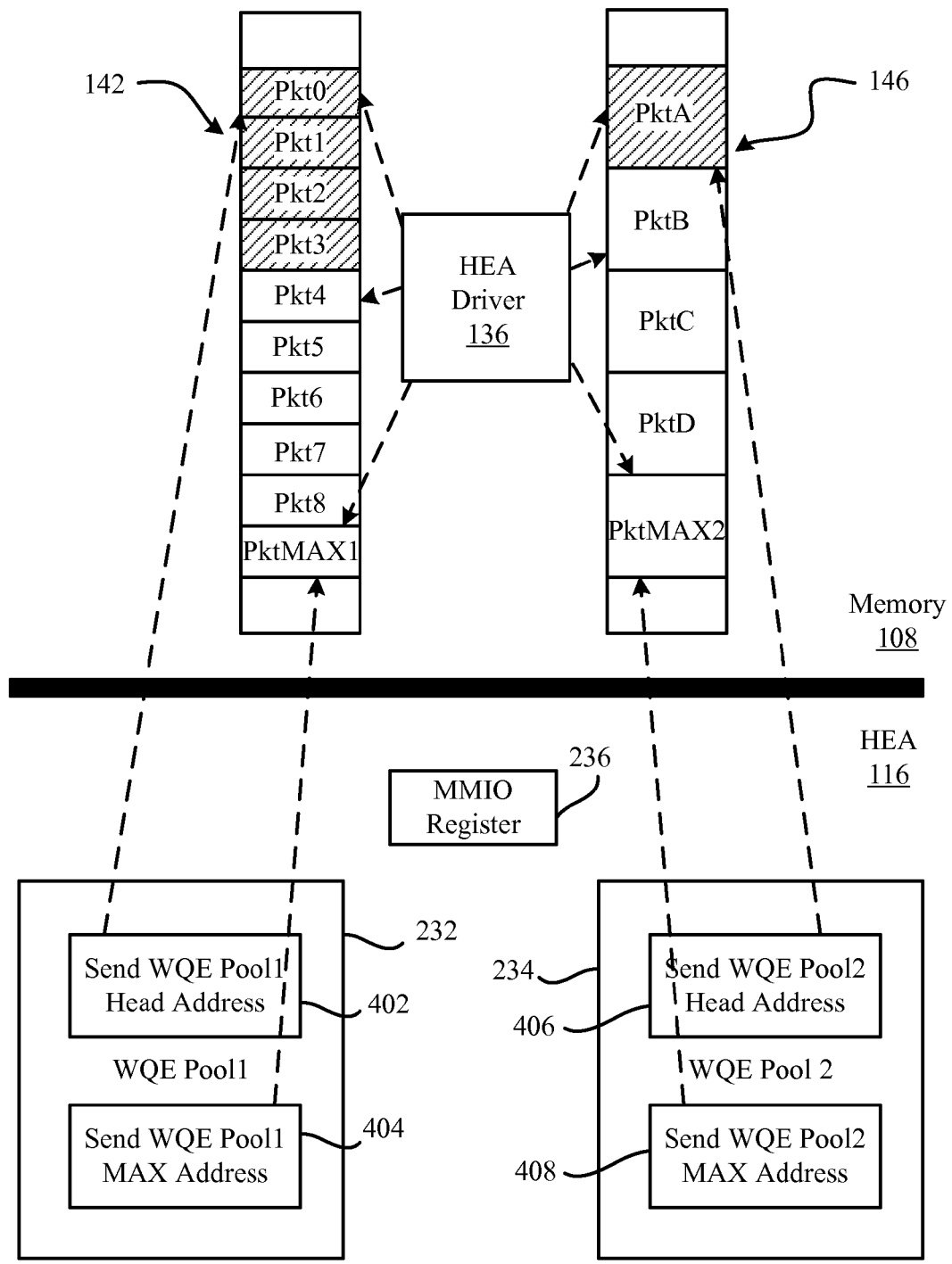
FIG. 4 illustrates send WQE pools of different WQE sizes and their memory address space according to an aspect.

FIG. 1 shows WQEs 150, 152, 154, and 156. While only one WQE is shown in respective send and receive queues 142, 146, and 144, 148, this is to simplify the illustration. It should be understood that the respective send and receive queues may each include multiple WQEs, as illustrated in FIGS. 3 and 4. The WQEs may serve several purposes. The WQEs may define a particular operation, such as a send or receive command to be carried out via HEA 116 communications, and an address. For example, a first send WQE 150 may define a first memory address for a packet in the first send queue 142. A first receive WQE 152 may define a first memory address for a packet in the first receive queue 144. A second send WQE 154 may define a second memory address for a packet in the second send queue 146. A second receive WQE 156 may define a second memory address for a packet in the second receive queue 148.

A WQE may also indicate the size of the packet. The amount of memory allocated for each queue pair 138 and 140 may vary between the first queue pair 138 and the second queue pair 140. The first queue pair 138 may be dedicated to small packets while the second queue pair 140 may be dedicated for large packets. For instance, the first queue pair 138 may be dedicated for small packet sizes that may be the size of a cache line or less. One example of the amount of data in a cache line may be 64 bytes; however other cache line sizes from 32 bytes to 128 bytes are common. The second queue pair 140 may be dedicated for large packets greater than a cache line but less than or equal to the largest data packet size such as 1500 bytes. The first WQEs 150 and 152 may point to 64 byte memory address ranges in the first queue pair 138, and the second WQEs 154 and 156 may point to 1500 byte memory address ranges in the second queue pair 140. The use of the 64 bytes and the 1500 bytes is for example only. Byte sizes of the first and second WQEs may be adjusted according to system requirements.

Although the application 130, the operating system 132, the device driver 134, the HEA driver 136, and the first and second queue pairs 138, 140 are illustrated as being contained within the memory 108 in the computer system 100, in other aspects some or all of them may be on different computer systems and may be accessed remotely, e.g., via the Ethernet network 104. The computer system 100 may use virtual addressing mechanisms that allow the programs of the computer system 100 to behave as if they only have access to a large, single storage entity instead of access to multiple, smaller storage entities. Thus, while the application 130, the operating system 132, the device driver 134, the HEA driver 136, and the first and second queue pairs 138, 140 are illustrated as being contained within the main memory 108, these elements are not necessarily completely contained in the same storage device at the same time. Further, although the application 130, the operating system 132, the device driver 134, the HEA driver 136, and the first and second queue pairs 138, 140 are illustrated as being separate entities, in other aspects some of them, portions of some of them, or all of them may be packaged together.

In an aspect, the application 130, the operating system 132, the device driver 134, and the HEA driver 136 may include instructions or statements that execute on the processor 106 or instructions or statements that may be interpreted by instructions or statements that execute on the processor 106, to carry out the functions as further described below with reference to FIGS. 2, 3, 4, and 5. In another aspect, the application 130, the operating system 132, the device driver 134, and the HEA driver 136, or two or more of these elements may be implemented in hardware via semiconductor devices, chips, logical gates, circuits, circuit cards, other physical hardware devices, or a combination of these devices in lieu of, or in addition to, a processor-based system.

The memory bus 118 may provide a data communication path for transferring data among the processor 106, the main memory 108, and the I/O bus interface 122. The I/O bus interface 122 may be further coupled to the I/O bus 120 for transferring data to and from the various I/O units. The I/O bus interface unit 122 may include a memory controller that manages read and writes to the main memory 108. The I/O bus interface unit 122 may communicate with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

The storage interface 112 supports the attachment of one or more disk drives or direct access storage devices 126 (which are typically rotating magnetic disk drive storage devices, although they could alternatively be other storage devices, including arrays of disk drives configured to appear as a single large storage device to a host computer). In another aspect, the storage device 126 may be implemented via any type of secondary storage device. The contents of the main memory 108, or any portion thereof, may be stored to and retrieved from the storage device 126 as needed. The I/O device interface 114 may provide an interface to any of various other input/output devices or devices of other types, such as printers or fax machines. The HEA 116 may provide one or more communications paths from the computer system 100 to other digital devices and computer systems 102; such paths may include, e.g., one or more Ethernet networks 104.

Figure 2:
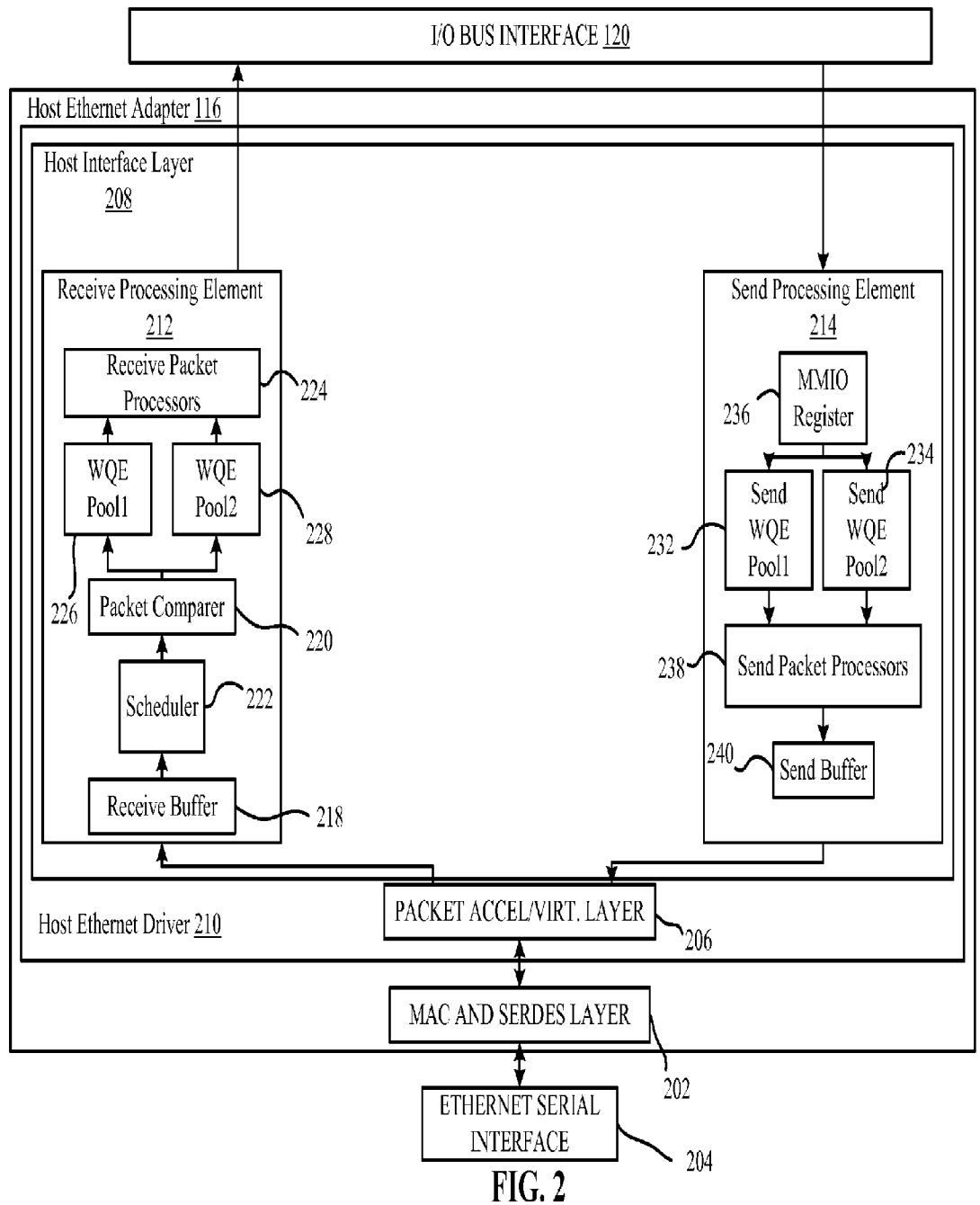
FIG. 2 is a block diagram of the HEA of FIG. 1 in greater detail according to an aspect.

FIG. 2 is a block diagram of an HEA 116 installed on a computer system 100 according to an aspect. The HEA 116 may include a media access control (MAC) and serializer/deserializer (Serdes) Layer 202 in direct communication with the Ethernet serial interface 204. Packets received by the MAC and Serdes layer 202 may be passed up to the packet acceleration and virtualization layer 206, and then to the host interface layer 208. The host interface layer 208 and the packet acceleration and virtualization layer 206 may be referred to collectively as a host Ethernet controller 210 and may be embodied as an application specific integrated circuit (ASIC). However, the host interface layer 208 may be a component that communicates through a programmable buffer interface card (PBIC) (not shown) to the I/O bus 120.

The host interface layer 208 may include a receive processing element 212 and a send processing element 214. The receive processing element 212 may include receive buffers 218, a packet comparer 220, a scheduler 222, and one or more receive packet processors 224. The receive processing element 212 may also include a first receive WQE pool 226 and a second receive WQE pool 228. The receive processing element 212 may receive packets from the packet acceleration and virtualization layer 206 and may communicate data to the I/O bus 120.

Similarly, the send processing element 214 may include send buffers 240, and one or more send packet processors 238. The send processing element 214 may also include a first send WQE pool 232 and a second send WQE pool 234. The send processing element may also include a memory mapped input/output (MMIO) register 236. The send processing element 214 may receive packets from the I/O bus 120 and may communicate data to the packet acceleration and virtualization layer 206.

The operation of the HEA 116 when receiving data packets from the Ethernet network 104 may include a data packet arriving into the HEA 116 through the MAC Serdes layer 202 to the packet acceleration and virtualization layer 206. In the packet acceleration and virtualization layer 206, the packet may be parsed, meta-data may be extracted, and a hash may be performed to place the packet in an ordered list. The data packet may be forwarded from the packet acceleration and virtualization layer 206 to the receive buffers 218 of the host interface layer 208. When the receive packet processor 224 is ready to process a packet, the scheduler 222 may dispatch the packet to the packet comparer 220. The packet comparer 220 may decide whether the first receive WQE pool 226 or the second receive WQE pool 228 may be used to assign the data packet to a respective WQE. The first receive WQE pool 226 may include memory or registers for storing a plurality of first receive WQEs 152, which may be dedicated for small data packets. The second receive WQE pool 228 may include memory or registers for storing a plurality of second receive WQEs 156, which may be dedicated for large data packets. If the packet correlates to the packet size of the first WQE pool 226, then the packet may be assigned to a first receive WQE 152. If the packet correlates to the packet size of the second WQE pool 228, then the packet may be assigned to a second receive WQE 156.

The data packet may be processed in the receive packet processor 224. Which WQE the packet is assigned to may determine where the packet is stored in the computer system 100. If the packet is assigned to a first receive WQE 152, then the receive packet processor 224 may send the packet with WQE information and a cache injection command onto the I/O bus 120 (FIG. 1) with a final intended destination of the L2 cache 128. The logic on the L2 cache 128 may have snooping capabilities adapted to retrieve and store data from the I/O bus 120 that is associated with cache injection commands. If the packet is assigned to a second receive WQE 156, then the receive packet processor 224 may send the packet with WQE information via a direct memory access (DMA) command onto the I/O bus 120 (FIG. 1) to the main memory 108. The packet may be stored in the memory address region allocated to the particular WQE assigned to the packet in the second receive queue 148 of the second queue pair 140. The packet assigned to a second receive WQE 156 may alternatively be sent onto the I/O bus 120 with a cache injection command, which the L2 cache 128 logic may snoop, retrieve, and store the large packet in the L2 cache 128.

Data packets may also be sent from the computer system 100 to the Ethernet network 104 via the HEA 116. The application 130 (FIG. 1) may produce data to send out on the Ethernet 104. In a send operation, the HEA driver 136 of the computer system 100 may be invoked to build a data packet with the application 130 data. To accomplish this, the HEA driver 136 may select the next available send WQE from a first send WQE pool 232 or the second send WQE pool 234. The first send WQE pool 232 may include the first send WQEs 150, dedicated for small data packets. The second send WQE pool 234 may include the second send WQEs 154, dedicated for large data packets. If the size of the packet correlates to the first WQE size then the packet may be assigned to next available first send WQE 150 by the HEA driver 136. If the size of the packet correlates to the second WQE size, then the packet may be assigned to next available second send WQE 154 by the HEA driver 136.

Even though the first send WQEs 150 are assigned to memory addresses in the first send queue 142 in the main memory 108, the HEA driver 136 may store the packets of the first send WQEs 150 in L2 cache 128. The HEA driver 136 may store the packets of the second send WQEs 154 in second send queue 146 in the main memory 108. Alternatively, the HEA driver 136 may issue commands to store each send WQE 150 and 154 in the desired memory type (L2 cache 128 or main memory 108). For instance, if cache is being minimally used by multiple processors, then the cache 128 may be used for large send WQEs 154.

The HEA driver 136 may also inform the HEA 116 of the WQE storage of the packet by storing a WQE address in the MMIO register 236. The HEA driver 136 may issue an MMIO command to the send packet processor 238 of the send processing element 214 of the HEA 116. The send packet processor 236 may retrieve the send WQE memory address from the MMIO register 236 and compare it with base address of the send WQE pool (232 or 234) to determine how many reads are necessary to obtain the packet from the L2 cache 128 or the main memory 108. Each read on the I/O bus 120 may be a cache line size, such as 64 bytes. If the send packet processor 238 determines from the address that obtaining the packet requires more than one read, then the send packet processor 238 may issue a read request to obtain a header of the packet to determine the size of the entire packet.

The packet may be read from the L2 cache 128 or the main memory 108 and stored in the send buffer 240. The packet may be sent to the packet acceleration and virtualization layer 206 and then to the MAC and Serdes layer 202 to build a frame that may be sent from the HEA 116 to the Ethernet network 104. The HEA 116 may inform the HEA driver 136 of the completion of the data transfer.

Assigning packets to different sized WQEs may minimize cache thrashing by limiting packet storage in the L2 cache 128 to small packet sizes in small WQEs. If only one WQE size is available, then L2 cache 128 may be not be effectively used. For example, a 64 byte packet may be stored in the L2 cache and the packet may be assigned to a WQE of 1500 bytes with address 0 and the next 64 byte packet may be stored in the L2 cache with address 1501. As a result, the address range 64-1436 will not be referenced for storing 64 byte packets, which reduces effective L2 cache size and may cause L2 thrashing.

Referring to FIG. 3, the first receive WQE pool 226 and the second receive WQE pool 228 of the HEA of FIG. 2 and the receive queues 144 and 148 of FIG. 1 are illustrated, according to an aspect. The first receive WQE pool 226 may contain a receive WQE tail address register 302 and a receive WQE MAX address register 304. The second receive WQE pool 228 may also contain a receive WQE tail address register 306 and a receive WQE MAX address register 308.

Each tail address register 302 and 306 may include the next available WQE memory address space to be used in a respective WQE pool. For example, in FIG. 3 the tail address register 302 may point to the memory address space of Pkt4, which may be the next available first receive WQE 152 to store packet data in the first receive queue 144. The shaded WQEs (Pkt0, Pkt1, Pkt2, and Pkt3) may be unavailable WQEs where packet data is currently stored. The MAX address register 304 may point to the maximum address PktMAX1 in the first receive queue 144. Furthermore, the tail address register 306 may point to the memory address of PktB, which may be the next available second receive WQE 156 to store packet data in the second receive queue 148. PktA may be a currently unavailable WQE, which is represented by the shading. The MAX address register 308 may point to the maximum address space PktMAX2 in the second receive queue 148.

The HEA driver 136 may also "know" the addresses of the first and second receive WQE pools 226 and 228. Upon system initialization, the HEA driver 136 may update the receive WQE pool 226 and 228 registers in the HEA 116 to the initial WQE. The HEA driver 136 may track the head addresses Pkt0 and PktA of the first and second receive queues 144, 148, respectively. The HEA driver 136 may track the tail addresses Pkt4 and PktB of the first and second receive queues 144, 148, respectively. Also, the HEA driver 136 may track the MAX addresses PktMAX1 and PktMAX2 of the first and second receive queues 144, 148, respectively. Once a WQE is used by the first or second receive WQE pool 226, 228, the HEA driver 136 may update the respective tail address register 302, 306 to point to the next available WQE.

Referring to FIG. 4, the first send WQE pool 232 and the second send WQE pool 234 of the HEA of FIG. 2 and the send queues 142 and 146 of FIG. 1 are illustrated, according to an aspect. The first send WQE pool 232 may contain a send WQE pool head address register 402 and a send WQE pool MAX address register 404. The second send WQE pool 232 may also contain a send WQE pool head address register 406 and a send WQE pool MAX address register 408. Each head address register 402 and 406 may manage the head addresses Pkt0 and PktA of the send queues 142,146. The MAX address registers 404 and 408 may manage the MAX addresses Pkt-MAX1 and PktMAX2 of the send queues 142, 146.

For example, in FIG. 4 the head address register 402 may point to the memory address space of Pkt0, which may be the first send WQE 150 having stored packet data in the first send queue 142 or L2 cache. Pkt0, Pkt1, Pkt2, and Pkt3 may be currently unavailable WQEs, which is represented by the shading. The MAX address register 404 may point to the maximum address space PktMAX1 in the first send queue 142. Likewise, the head address register 406 may point to the memory address space of PktA, which may be the second send WQE 154 having stored packet data in the second receive queue 146. PktA may be a currently unavailable WQE, which is represented by the shading. The MAX address register 408 may point to the maximum address space PktMAX2 in the second receive queue 148. The head addresses Pkt1 and PktA may represent the WQE that contains the next packet the HEA 116 may send on the Ethernet network 104 from the system 100.

The HEA driver 136 may "know" the addresses of the first and second receive WQE pools 232 and 234. Upon system initialization, the HEA driver 136 may update the send WQE pool 232 and 234 registers in the HEA 116 with the current head and MAX WQE. The HEA driver 136 may track the head addresses Pkt0 and PktA of the first and second receive queues 144, 148, respectively. The HEA driver 136 may track the tail addresses Pkt4 and PktB of the first and second receive queues 144, 148, respectively. Also, the HEA driver 136 may track the MAX addresses PktMAX1 and PktMAX2 of the first and second receive queues 144, 148, respectively. Once a WQE is used from the first or second receive WQE pool 226, 228, the respective head address register 402, 406 may update and point to the next available WQE.

Figure 5:
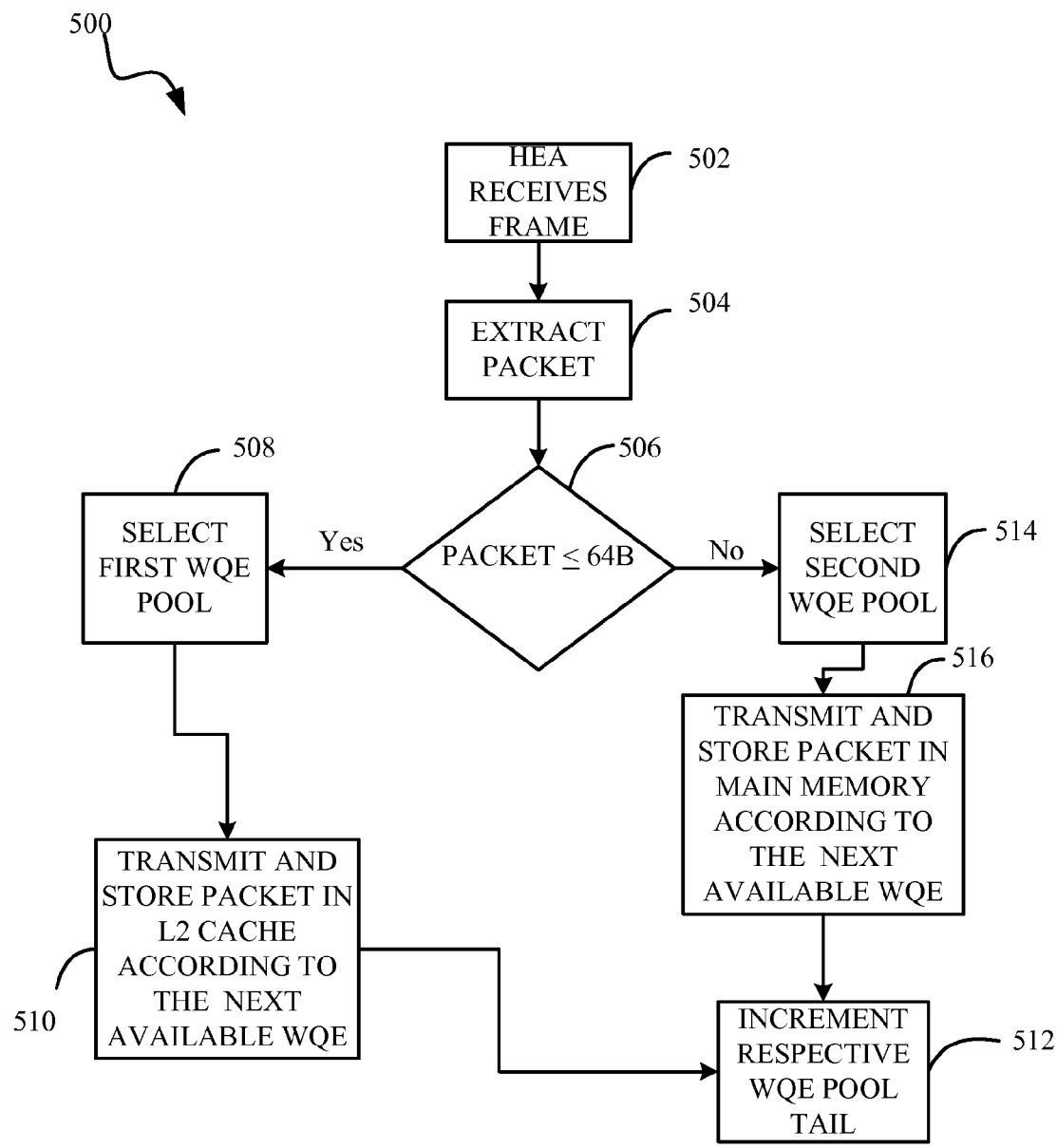
FIG. 5 is a flowchart of a method for receiving data packets via the HEA according to an aspect.

Referring to FIG. 5, according to an aspect, a method 500 for receiving data packets by a computer system 100 over an Ethernet network 104 is described. The method 500 may include receiving data packets by the computer system 100 from the Ethernet network 104 via the HEA 116. In operation 502, the HEA 116 may wait for a packet containing frame from the Ethernet network 104. In operation 504, once the frame is received, the packet may be extracted from the frame by HEA 116 hardware. In operation 506, the packet comparer 220 may determine whether the packet size is less than or equal to the first WQE size. In operation 508, if the packets meet this criterion, then the next available WQE from the first receive WQE pool 226 may be selected. In operation 510, the packet may be transmitted via the I/O bus 120 and stored in the L2 cache 128 according to the next available first receive WQE 152. In operation 512, the first receive WQE pool 226 tail may be incremented. In operation 514, if the packet is larger than the first WQE size then the next available second receive WQE 156 from the second receive WQE pool 228 may be selected. In operation 516, the packet may be transmitted via the I/O bus 120 with a DMA command, retrieved by the main memory 108, and stored in the second receive queue 148. In operation 512, the second receive WQE pool 228 tail may be incremented.

Figure 6:
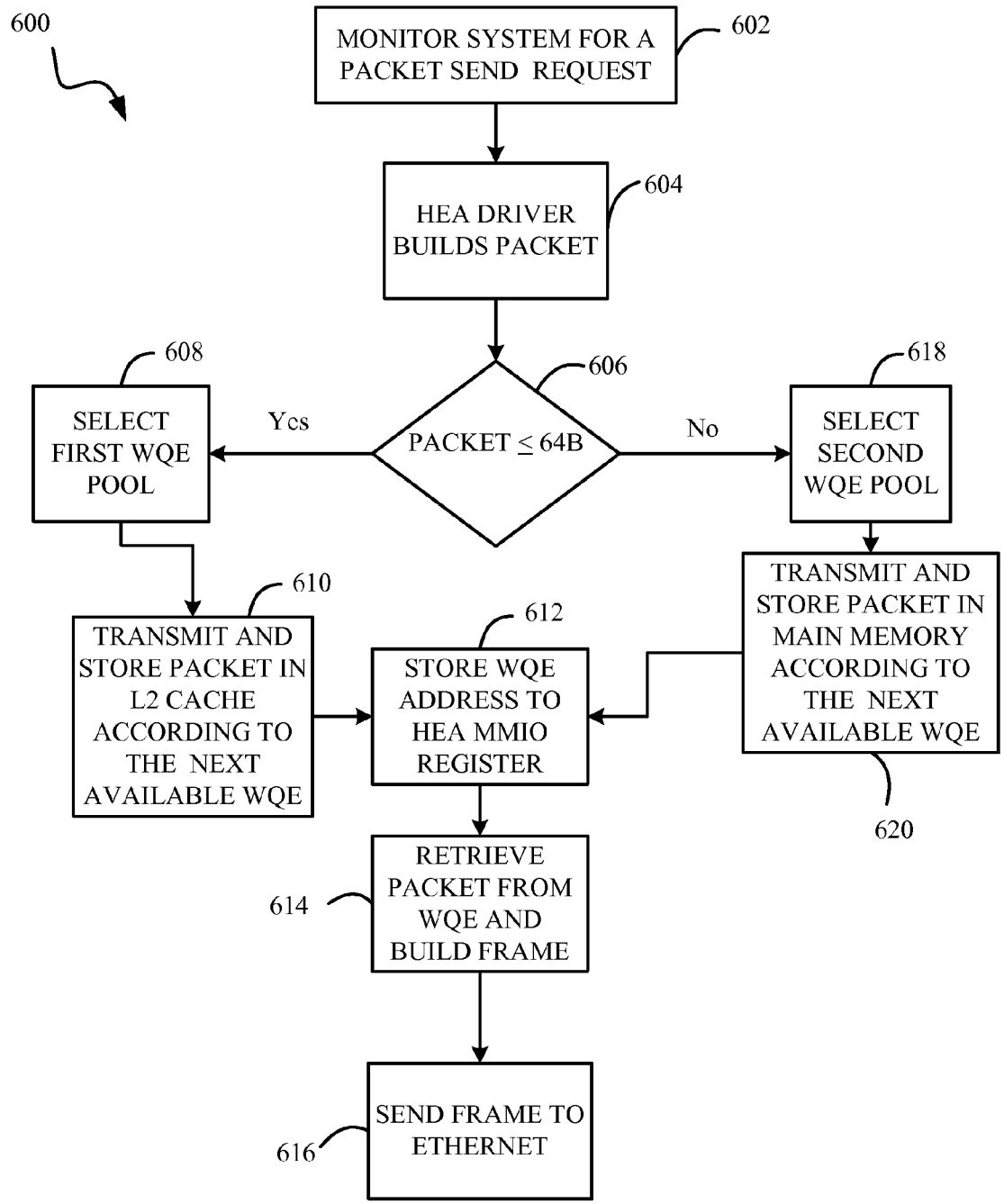
FIG. 6 is a flowchart of a method for sending data packets via the HEA according to an aspect.

Now referring to FIG. 6, a method 600 for sending data packets from a computer system 100 to an Ethernet network 104 is described according to an embodiment. With regards to sending packets from the system 100 to the Ethernet network 104, the HEA driver 136 may monitor the system 100 for a packet send request and detect a send request in operation 602. In operation 604, the HEA driver 136 may build a packet from the data produced by an application. In operation 606, the HEA driver 136 may select a send WQE pool for the packet. If the packet size is less than or equal to the first WQE size, then, in operation 608, a first send WQE 150 from the first send WQE pool 232 may be selected. In operation 610, the HEA driver 136 may issue a cacheable store command for the packet and store the packet in the L2 cache 128. In operation 612, the WQE address may be stored in the MMIO register 236. If during operation 606 the packet is greater than the first WQE size, then the second send WQE pool 234 may be selected in operation 618. In operation 620, the HEA driver 136 may store the packet in an available second send WQE 154 in the second send queue 148 in the main memory 108. The WQE address of the packet may also be stored in the MMIO register 236 in the HEA 116. In operation 614, a MMIO command from the HEA driver 136 may signal the send packet processor 238 to read the packet from the memory 108 at the address specified in the MMIO register 236. The send processor 238 may compile the packet and build a frame. In operation 616, the frame may be sent from the HEA 116 to the Ethernet network 104.

While the invention has been described with reference to the specific aspects thereof, those skilled in the art will be able to make various modifications to the described aspects of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A computer system, comprising:
a host Ethernet adapter (HEA) adapted to: receive a frame from an Ethernet network, parse the frame to determine a data packet size, and select, based on the determined data packet size, a work queue element (WQE) from two or more available WQEs having different data packet size capacity; and
data packet storage for each WQE, including at least some cache storage associated with a processor, wherein the HEA is operable to store the data packet in the data packet storage based on the selected WQE, wherein the HEA is further operable to limit storage of data packets in the cache storage to data packets in WQEs having a data packet size capacity that is less than or equal to a cache line size, wherein data packets in WQEs having a data packet size capacity that is greater than the cache line size are stored in main memory.

2. The system of claim 1, wherein the data packet size capacity of the WQE is the cache line size.

3. The system of claim 2, wherein the cache line size is 64 bytes.

4. The system of claim 1, wherein the data packet size capacity of the WQE is a maximum data packet size.

5. The system of claim 1, furthering comprising two or more processors, wherein the cache is shared by the two or more processors.

6. The system of claim 1, wherein the cache is an L2 cache.

7. The system of claim 1, further comprising:
a HEA driver adapted to: determine the data packet size of a system produced data packet, select a WQE from the two or more available WQEs having different data packet size capacity, and store the data packet in the data packet storage associated with the selected WQE based on the data packet size, wherein the HEA driver is adapted to limit storage of system produced data packets to system produced data packets in WQEs having a data packet size capacity that is less than or equal to a cache line size, wherein the HEA is adapted to retrieve the data packet from the selected WQE, build a frame, and send the frame, via a host Ethernet adapter, to an Ethernet network.

8. The system of claim 1, wherein the data packet is stored within a single storage entity.

9. The system of claim 1, wherein the main memory includes a set of dynamic random-access memory (DRAM) blocks.

* * * * *